US006818708B2

United States Patent
Satou et al.

(10) Patent No.: US 6,818,708 B2
(45) Date of Patent: Nov. 16, 2004

(54) METHOD OF POLYMERIZING OLEFIN

(75) Inventors: Hideki Satou, Yamaguchi (JP); Shinji Araki, Chiba (JP); Hiromi Adachi, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 113 days.

(21) Appl. No.: 10/221,166

(22) PCT Filed: Mar. 26, 2001

(86) PCT No.: PCT/JP01/02414
§ 371 (c)(1),
(2), (4) Date: Sep. 18, 2002

(87) PCT Pub. No.: WO01/72850
PCT Pub. Date: Oct. 4, 2001

(65) Prior Publication Data
US 2003/0130444 A1 Jul. 10, 2003

(30) Foreign Application Priority Data
Mar. 27, 2000 (JP) .......................................... 2000-85950

(51) Int. Cl.⁷ ................................................. C08F 2/34
(52) U.S. Cl. ............................ 526/61; 526/68; 526/70; 526/71; 526/73; 526/348; 526/901; 526/65; 526/905
(58) Field of Search ............................. 526/61, 65, 68, 526/70, 71, 73, 348, 901, 905

(56) References Cited

U.S. PATENT DOCUMENTS 6,271,318 B1 * 8/2001 Satou et al. .................. 526/65

FOREIGN PATENT DOCUMENTS

| JP | 10-204123 | 8/1998 |
| JP | 11-209414 | 8/1999 |

* cited by examiner

Primary Examiner—William K. Cheung
(74) Attorney, Agent, or Firm—Oblon, Spivak, McClelland, Maier & Neustadt, P.C.

(57) ABSTRACT

The process for polymerizing olefins uses a plurality of series-connected polymerization reactors in which at least one of second and subsequent reactors is a vapor-phase polymerization reactor containing a multicomponent gas. The process comprises the steps of: taking the multicomponent gas out of the vapor-phase polymerization reactor; mixing the multicomponent gas with an inert gas which is lighter than at least one component of the multicomponent gas, thereby obtaining a mixed gas; compressing and/or cooling the mixed gas to liquefy a part of the multicomponent gas; discharging at least a part of a gaseous mixture comprising the inert gas and an unliquefied multicomponent gas out of a reaction system; and returning a fluid comprising the remainder of the gaseous mixture and the liquefied multicomponent gas to the vapor-phase polymerization reactor. By mixing the multicomponent gas taken out of the vapor-phase polymerization reactor with the inert gas, the composition of gas in the vapor-phase polymerization reactor is effectively controlled, thereby ensuring a stable production of olefin polymers of a desired molecular weight distribution and composition.

14 Claims, 1 Drawing Sheet

METHOD OF POLYMERIZING OLEFIN

FIELD OF THE INVENTION

The present invention relates to a process for polymerizing olefins such as ethylene and propylene, and more particularly to a process for polymerizing olefins using a multi-stage polymerization apparatus including a vapor-phase polymerization reactor in which the composition of gas in a second- or subsequent-stage vapor-phase polymerization reactor is easily controlled.

BACKGROUND ART

Of the conventional industrial processes for polymerizing olefins represented by ethylene and propylene, a vapor-phase polymerization process has been particularly noticed because the recent improvement in the activity of the catalyst for this process renders the deashing of polymer product for removing catalyst residue unnecessary. However, in the conventional continuous multistage vapor-phase polymerization processes, the composition of gas in an earlier-stage polymerization reactor directly influences that of a later-stage polymerization reactor. The control of the composition of gas in the later-stage polymerization reactor sometimes becomes labor-intensive and costly.

For example, in ordinary production of polymers having a broad molecular weight distribution, a low-molecular weight polymer produced in an earlier-stage reactor is further polymerized into a high-molecular weight polymer in a later-stage reactor. The earlier-stage polymerization is performed in the presence of hydrogen as a molecular weight modifier in a high concentration. On the other hand, the later-stage polymerization is required to be performed in a low hydrogen concentration. Therefore, the accompanying hydrogen during the transfer of the polymers obtained in the earlier-stage reactor to the later-stage reactor should be reduced to a large extent.

In the production of copolymers such as ethylene-propylene copolymers, it is also required to control the composition of gas in each stage polymerization reactor.

Under these circumstances, various methods have been proposed to control the composition of gas in the later-stage vapor-phase polymerization reactor. For example, Japanese Patent Application Laid-Open No. 59-230010 discloses a method of reducing the concentration of hydrogen (molecular weight modifier) in the accompanying gas from the earlier-stage reactor by providing an intermediate receiver (purge vessel) between the earlier-stage and later-stage polymerization reactors, thereby removing the accompanying gas and transferring only the polymer to the later-stage reactor. U.S. Pat. No. 4,420,592 discloses a method in which the accompanying gas from the earlier-stage reactor is diluted with an inert gas in the intermediate receiver to reduce the hydrogen concentration, and then transferred to the later-stage reactor together with the polymer. Japanese Patent Application Laid-Open No. 7-118342 discloses a method using an intermediate receiver comprising a gas vessel, a powder vessel and a valve disposed between the vessels. The accompanying gas is removed by the open-close operation of the valve, and the polymer in the powder vessel is forced into the later-stage reactor by a pressure gas circulated from the later-stage reactor. However, these conventional methods are still unsatisfactory since they require the intermediate reactor, the complicated valve operation, etc.

SUMMARY OF THE INVENTION

An object of the present invention is to provide a process for polymerizing olefins using a multistage polymerization apparatus including a later-stage vapor-phase polymerization reactor, in which the composition of gas in the later-stage vapor-phase polymerization reactor is easily controlled to ensure stable production of polymers having a desired composition.

The inventors have already proposed, in Japanese Patent Application Laid-Open No. 11-209414, a method for controlling the composition of gas in a later-state vapor-phase polymerization reactor in a continuous multistage polymerization of olefins. In the proposed method, after liquefying a part (heavy component) of a multicomponent gas taken out of the later-stage vapor-phase polymerization reactor by compressing and/or cooling, at least a part of the non-liquefied gas is removed from the reaction system and the remaining gas is, together with the liquefied gas, returned to the later-stage polymerization reactor, thereby controlling the composition of gas in the later-stage vapor-phase polymerization reactor. With this method, it has become possible to simultaneously carry out the control of the composition of gas in the later-stage polymerization reactor and the temperature control of the later-stage polymerization reactor (removal of polymerization heat).

The inventors have continued the study on this method, and found that the composition of gas in the later-stage vapor-phase polymerization reactor is effectively controlled by mixing a multicomponent gas taken out of the later-stage vapor-phase polymerization reactor with an inert gas such as nitrogen which is lighter than at least one component (e.g., olefins) of the multicomponent gas. The present invention has been accomplished based on this finding.

Thus, in a first aspect of the present invention, there is provided a process for polymerizing olefins using a plurality of series-connected polymerization reactors in which at least one of second and subsequent reactors is a vapor-phase polymerization reactor containing a multicomponent gas, the process comprising:

taking out the multicomponent gas from the vapor-phase polymerization reactor;

mixing the multicomponent gas with an inert gas which is lighter than at least one component of the multicomponent gas, thereby obtaining a mixed gas;

compressing and/or cooling the mixed gas to liquefy a part of the multicomponent gas;

discharging at least a part of a gaseous mixture comprising the inert gas and an unliquefied multicomponent gas out of a reaction system; and returning a fluid comprising the remainder of the gaseous mixture and the liquefied multicomponent gas to the vapor-phase polymerization reactor.

In a second aspect of the present invention, there is provided a process for polymerizing olefins using a plurality of series-connected polymerization reactors in which at least one of second and subsequent reactors is a vapor-phase polymerization reactor containing a multicomponent gas comprising an olefin and hydrogen, the process comprising:

taking out the multicomponent gas from the vapor-phase polymerization reactor;

mixing the multicomponent gas with an inert gas which is lighter than the olefin in the multicomponent gas, thereby obtaining a mixed gas;

compressing and/or cooling the mixed gas to liquefy at least a part of the olefin in the multicomponent gas;

discharging at least a part of a gaseous mixture comprising the inert gas and the unliquefied multicomponent gas out of a reaction system; and returning a fluid comprising the remainder of the gaseous mixture and the liquefied olefin to the vapor-phase polymerization reactor.

PREFERRED EMBODIMENT OF THE INVENTION

Figure 1:
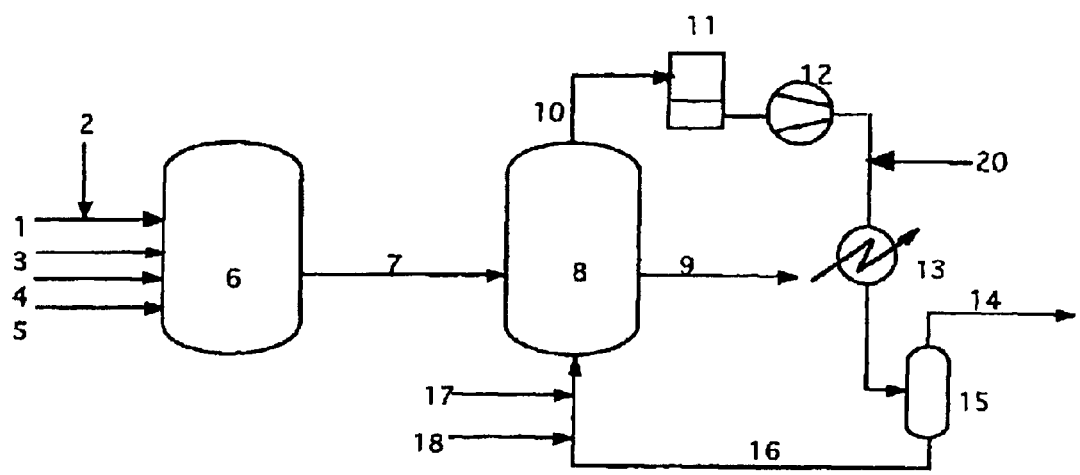
FIG. 1 is a flow diagram showing an embodiment of the present invention.

The present invention will be described in detail below.

(A) Olefin Polymerization

The olefin polymerization according to the present invention is applicable to homopolymerization or copolymerization of olefins such as ethylene, propylene, butene-1, pentene-1, hexene-1, octene-1 and 4-methylpentene-1, or copolymerization of these olefins with other monomers.

The process for the polymerization of olefins according to the present invention is usually performed in the presence of a catalyst. As the catalyst, there may be used those ordinarily used for the polymerization of olefins, for example, ordinary Ziegler solid catalysts.

The ordinary Ziegler solid catalysts are composed of a titanium compound, an organoaluminum compound and an electron donor. Examples of the titanium compound include titanium halides such as titanium tetrachloride, titanium tetrabromide and titanium tetraiodide. These titanium compounds may be supported on carriers. Examples of the organoaluminum compound include alkylaluminums such as trimethylaluminum and triethylaluminum. Examples of the electron donor used for controlling stereoregularity, molecular weight, molecular weight distribution, etc. include organosilane compounds such as tetraethoxysilane, diphenyldimethoxysilane and dicyclopentyldimethoxysilane.

The polymerization process, to which the present invention is applied, is performed in a continuous multistage manner using a plurality of polymerization reactors, usually 2 to 10 reactors, connected in series. At least one of the second- and subsequent-stage reactors is a vapor-phase polymerization reactor. More specifically, as long as at least one of the second- and subsequent-stage reactors is a vapor-phase polymerization reactor, any multistage polymerization apparatuses, e.g., those constituted by either vapor-phase polymerization reactors solely or the combination of vapor-phase polymerization reactors, liquid-phase polymerization reactors, etc., may be used in the present invention. In the present specification, the vapor-phase polymerization reactor disposed at a second- or subsequent-stage may be referred to as "later-stage vapor-phase polymerization reactor".

The "vapor-phase polymerization reactor" referred to herein is a reactor for polymerizing gaseous monomers in vapor phase in the presence of a catalyst. During the polymerization, powdery polymers produced and unreacted monomer gases coexist in the vapor-phase polymerization reactor. Typical examples of various type of the vapor-phase polymerization reactors include a vertical agitation vapor-phase polymerization reactor, a horizontal agitation vapor-phase polymerization reactor and a fluidized bed vapor-phase polymerization reactor.

The "liquid-phase polymerization reactor" generally means a reactor for polymerizing starting monomers in liquid phase. The starting monomer is liquefied or diluted with a solvent, e.g., a paraffinic solvent such as n-heptane and hexane. The produced polymer including catalyst is present in the liquid phase in the form of slurry. Examples of the liquid-phase polymerization reactor are a loop-type bulk polymerization reactor and an agitation slurry polymerization reactors.

In a polymerization apparatus using the vapor-phase polymerization reactor in combination with the liquid-phase polymerization reactor, a vaporizing or liquefying device for phase change is required between the reactors because of the difference in phase between the vapor-phase polymerization reactor and the liquid-phase polymerization reactor.

The arrangements of polymerization reactors for two-stage, three-stage and four or more-stage polymerization processes to which the present invention is applied will be described below. In the following, "V" represents a vapor-phase polymerization reactor, "L" represents a liquid-phase polymerization reactor, and dash "-" means a connection between reactors.

(1) Two-stage polymerization
   V-V and L-V.
(2) Three-stage polymerization
   V-V-V, L-V-V, V-L-V, L-L-V, V-V-L, and L-V-L.
(3) Four or more-stage polymerization Any arrangements may be used as long as, like the above, at least one of the second- and subsequent-stage reactors is a vapor-phase polymerization reactor.

The conditions for the olefin polymerization to which the present invention is applied, e.g., polymerization temperature, polymerization pressure, polymerization time, monomer ratio for copolymerization and amount of catalyst, are not particularly restricted and may be appropriately selected from those employed in the conventional process. Thus, the present invention is applicable to any conventional olefin polymerization processes carried out under any conditions as long as the polymerization process uses the later-stage vapor-phase polymerization reactor.

(B) Control of Composition of Gas in Later-Stage Vapor-Phase Polymerization Reactor As described above, the present invention is applied to a polymerization process in which olefins are polymerized in a continuous multistage manner using a plurality of polymerization reactors connected in series, wherein at least one of the second- and subsequent-stage reactors is a vapor-phase polymerization reactor. The composition of gas in the later-stage vapor-phase polymerization reactor should be controlled to modify a molecular weight distribution, a polymerization ratio of monomers, and molecular weights of homopolymer moieties and copolymer moieties. The present invention provides a method for easily controlling the composition of gas from the earlier-stage polymerization reactor when the composition of gas is undesirable for the polymerization reaction to be performed in the later-stage polymerization reactor.

In the process of the present invention, to control the composition of gas, a multicomponent gas taken out of the later-stage polymerization reactor is mixed with an inert gas which is lighter than at least one component of the multicomponent gas, and then, a part of the multicomponent gas (heavy component) is liquefied by compressing and/or cooling to separate the light gas and the heavy component. After removing a part of the light gas from the system, the rest of the light gas and the liquefied heavy component are returned to the later-stage polymerization reactor.

The term "multicomponent" used for describing the gas taken out of the later-stage vapor-phase polymerization reactor means that the monomers being polymerized are multicomponent or hydrogen as a molecular weight modifier coexists in the reactor in addition to the monomer or monomers.

The multicomponent gas is preferably taken out from an upper portion of the later-stage vapor-phase polymerization reactor at 20 to 100° C. This is because that the upper 20 to 30% inside the vapor-phase polymerization reactor such as an agitation vapor-phase polymerization reactor and a fluidized bed vapor-phase polymerization reactor is mainly occupied by gases and a lower portion is mainly occupied by powdery polymers.

The multicomponent gas taken out of the later-stage vapor-phase polymerization reactor is mixed with an inert gas. The mixing ratio is preferably 0.01 to 2 parts by weight of the inert gas based on 100 parts by weight of the multicomponent gas. The "inert gas" means a gas which does not react in the polymerization system with olefins in the multicomponent gas, hydrogen, etc. Therefore, besides nitrogen, the inert gas may be a saturated hydrocarbon such as methane, ethane, propane and butane. The inert gas should be lighter, i.e., less liquefiable than at least one component, for example heaviest olefins, of the multicomponent gas from the later-stage vapor-phase polymerization reactor. In addition, the inert gas is more preferably heavier than at least one component, for example hydrogen, of the multi-component gas.

The mixed gas of the multicomponent gas from the later-stage vapor-phase polymerization reactor and the inert gas is then compressed and/or cooled to liquefy a part of the mixed gas, preferably at least 80% by weight of the heavy component. The mixed gas may be compressed and/or cooled under any conditions as long as a part of the mixed gas is satisfactorily liquefied. Usually, the mixed gas is compressed to preferably 1 to 2 MPa by a compressor, etc., and then cooled to preferably −30 to 25° C. by a heat exchanger. Alternatively, the compression may be effected by mixing a compressed multicomponent gas from the later-stage vapor-phase polymerization reactor with an inert gas of a corresponding pressure. In addition, the cooling may be performed using a plurality of heat exchangers such that an inert gas is fed to the inlet of the heat exchanger where the liquefaction of the multicomponent gas begins.

During the liquefaction of the mixed gas, the heavy component, usually heavy olefins, in the multicomponent gas from the later-stage vapor-phase polymerization reactor is preferentially liquefied. Consequently, the remaining unliquefied gas becomes rich in the light component such as hydrogen and light olefins. At least a part of the light component-rich gas, for example, an amount corresponding to 20% by weight or less, preferably 10% by weight or less, each excluding zero, of the multicomponent gas taken out of the reactor is discharged from the system together with the inert gas. The remainder of the light component-rich gas and the liquefied gas are returned (recycled) to the later-stage vapor-phase polymerization reactor, so that the gas composition in the later-stage vapor-phase polymerization reactor becomes rich in the heavy component.

Since the liquefied gas returned to the later-stage vapor-phase polymerization reactor is vaporized therein, the heat of reaction generated in the later-stage vapor-phase polymerization reactor can be removed by the latent heat of vaporization. Thus, in accordance with the present invention, the gas composition and the temperature in the later-stage vapor-phase polymerization can be simultaneously controlled.

The molar ratio of the fluid returned to the later-stage vapor-phase polymerization reactor to the multicomponent gas taken out of the later-stage vapor-phase polymerization reactor is not particularly restricted, and preferably 0.5 or greater, more preferably 0.7 or greater, most preferably 0.9 or greater in view of the balance between the removal of the heat of reaction generated in the reactor and the saving of energy. In the present invention, to reduce the hydrogen concentration in the later-stage vapor-phase polymerization reactor, the hydrogen concentration of the fluid returned to the later-stage vapor-phase polymerization reactor is preferably 10 mol % or lower, more preferably 1 mol % or lower, most preferably 0.3 mol % or lower in view of increasing the molecular weight of polymer to be produced in the reactor.

A preferred embodiment of the present invention will be explained below by reference to FIG. 1.

FIG. 1 is a flow diagram illustrating the present invention applied to a process in which propylene is vapor phase-homopolymerized in a first reactor and propylene and ethylene are vapor phase-copolymerized in a second reactor. Into a first reactor 6, propylene, a titanium catalyst, hydrogen, an organoaluminum compound and an electron donor are fed respectively through a propylene feed line 1, a titanium catalyst feed line 2, a hydrogen feed line 3, an organoaluminum compound feed line 4, and an electron donor feed line 5, and then, the homopolymerization of propylene is carried out in vapor phase. The resultant polymer powder and an accompanying gas are fed through a powder transfer line 7 to a second reactor 8 where propylene and ethylene are copolymerized in vapor phase. The polymer powder produced in the second reactor 8 together with the accompanying gas is taken out from a powder transfer line 9 to outside the system. A circulating gas 10 composed of the multicomponent gas taken out of the second reactor 8, being used partly for the purpose of cooling, i.e., removal of heat of reaction, is passed through a filter 11, compressed by a compressor 12, and then introduced together with an inert gas such as nitrogen from an inert gas feed line 20 into a heat exchanger 13 where the gaseous mixture are cooled to form a vapor-liquid mixed flow. The vapor-liquid mixed flow is separated into liquid phase and vapor phase in a separator 15. At least a part of the gas (light component) is discharged through a vent line 14, and the remaining separator liquid 16 which may contain gas is returned to the second reactor 8. Ethylene and propylene for the production of copolymer in the second reactor 8 are fed through an ethylene feed line 17 and a propylene feed line 18.

In the present invention, the separation of the light gas in the gas from the later-stage vapor-phase polymerization reactor may be carried out in two or more stages, if required. Namely, the multicomponent gas taken out of the later-stage vapor-phase polymerization reactor is mixed with the inert gas and the resultant mixed gas is compressed and/or cooled to partly liquefy. Then, only the liquefied gas is returned to the later-stage vapor-phase polymerization, and the unliquefied gas is further compressed and/or cooled to partly liquefy. Thereafter, at least a part of the unliquefied gas is discharged out of the system, and the remaining gas and the liquefied gas are recycled to the later-stage vapor-phase polymerization reactor. The above steps may be performed in multiple stages. Also, a distillation column may be used to obtain a higher separation.

With the above multistage procedure, the light gas is concentrated in the gas taken out of the later-stage vapor-phase polymerization reactor to enhance the separation efficiency of the light gas.

(C) Application Example of the Present Invention

Examples of application of the present invention to olefin polymerization will be described below.

(1) Two-Stage Polymerization

As described below, the present invention is applicable to the process where a relatively light component is fed into the second reactor (later-stage vapor-phase polymerization reactor) in an amount more than needed by the gas and/or liquid accompanying the polymer from the first reactor. In each case, by mixing an inert gas, e.g., a nitrogen gas, with the multicomponent gas (circulating gas) taken out of the second reactor, the production of the aimed polymer becomes possible.

(i) First Reactor: Low-Molecular Weight Propylene Homopolymer

Second Reactor: High-Molecular Weight Propylene Homopolymer

The hydrogen concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(ii) First Reactor: Low-Molecular Weight Ethylene Homopolymer

Second Reactor: High-Molecular Weight Ethylene Homopolymer

The hydrogen concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(iii) First Reactor: Low-Molecular Weight Propylene Homopolymer

Second Reactor: High-Molecular Weight Propylene-Ethylene Copolymer

The hydrogen concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(iv) First Reactor: Low-Molecular Weight Ethylene Homopolymer

Second Reactor: High-Molecular Weight Propylene-Ethylene Copolymer

The hydrogen concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(v) First Reactor: Propylene Homopolymer

Second Reactor: Propylene-1-Butene Copolymer

The propylene concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(vi) First Reactor: Ethylene Homopolymer

Second Reactor: Ethylene-Propylene Copolymer

The ethylene concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(vii) First Reactor: Ethylene Homopolymer

Second Reactor: Ethylene-1-Hexene Copolymer

The ethylene concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(viii) First Reactor: Low-Molecular Weight Ethylene-Propylene Copolymer

Second Reactor: High-Molecular Weight Ethylene-Propylene Copolymer

The hydrogen concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(ix) First Reactor: Ethylene-Propylene Copolymer

Second Reactor: Ethylene-Propylene Copolymer Having a Higher Propylene Content than the Above The ethylene concentration of the multicomponent gas from the second reactor is increased by the incorporation of nitrogen and the partial liquefaction. Then, after discharging a part of the unliquefied gas and nitrogen through the vent line of the circulating system, the liquefied gas and the remaining unliquefied gas are recycled to the second reactor.

(2) Three-Stage Polymerization

As described below, the present invention is applicable to the process where a relatively light component is fed into the second reactor in an amount more than needed by the gas and/or liquid accompanying the polymer from the first reactor, and a relatively light component is fed into the third reactor in an amount more than needed by the gas and/or liquid accompanying the polymer from the second reactor. In each case, by mixing an inert gas, e.g., a nitrogen gas, with the multicomponent gas (circulating gas) taken out of the second or third reactor, the production of the aimed polymer becomes possible.

(i) First Reactor: Low-Molecular Weight Propylene Homopolymer

Second Reactor: High-Molecular Weight Propylene Homopolymer

Third Reactor: Still Higher-Molecular Weight Propylene Homopolymer

The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the hydrogen concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(ii) First Reactor: Low-Molecular Weight Ethylene Homopolymer

Second Reactor: High-Molecular Weight Ethylene Homopolymer

Third Reactor: Still Higher-Molecular Weight Ethylene Homopolymer

The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the hydrogen concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(iii) First Reactor: Low-Molecular Weight Propylene Homopolymer

Second Reactor: High-Molecular Weight Propylene Homopolymer

Third Reactor: Ethylene-Propylene Copolymer

The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the hydrogen concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(iv) First Reactor: Low-Molecular Weight Ethylene Homopolymer

Second Reactor: High-Molecular Weight Ethylene Homopolymer

Third Reactor: Ethylene-Propylene Copolymer

The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the ethylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(v) First Reactor: Low-Molecular Weight Propylene Homopolymer

Second Reactor: High-Molecular Weight Propylene Homopolymer

Third Reactor: Propylene-1-Butene Copolymer

The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the propylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(vi) First Reactor: Low-Molecular Weight Propylene Homopolymer

Second Reactor: High-Molecular Weight Propylene Homopolymer

Third Reactor: Propylene-1-Butene Copolymer

The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the hydrogen concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(vii) First Reactor: Propylene Homopolymer

Second Reactor: Ethylene-Propylene Copolymer

Third Reactor: Ethylene-Propylene Copolymer Having a Higher Propylene Content than the Above The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the ethylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(viii) First Reactor: Ethylene Homopolymer

Second Reactor: Ethylene-Propylene Copolymer

Third Reactor: Ethylene-Propylene Copolymer Having a Higher Propylene Content than the Above The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the ethylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(ix) First Reactor: Ethylene Homopolymer

Second Reactor: Ethylene-Propylene Copolymer

Third Reactor: Ethylene-Propylene Copolymer Having a Higher Propylene Content than the Above The ethylene concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the ethylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(x) First Reactor: Ethylene Homopolymer

Second Reactor: Ethylene-1-Hexene Copolymer

Third Reactor: Ethylene-1-Hexene Copolymer Having a Higher 1-Hexene Content than the Above The hydrogen concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the ethylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

(xi) First Reactor: Ethylene Homopolymer

Second Reactor: Ethylene-1-Hexene Copolymer

Third Reactor: Ethylene-1-Hexene Copolymer Having a Higher 1-Hexene Content than the Above The ethylene concentration of the multicomponent gas from the second reactor is increased by the incorporation of an inert gas and the partial liquefaction. Then, after discharging a part of the unliquefied gas and nitrogen through the vent line of the circulating system for the second reactor, the liquefied gas and the remaining unliquefied gas are recycled to the second reactor. Next, the ethylene concentration of the multicomponent gas from the third reactor is increased by the incorporation of an inert gas and the partial liquefaction. Then, after discharging a part of the unliquefied gas and nitrogen through the vent line of the circulating system for the third reactor, the liquefied gas and the remaining unliquefied gas are recycled to the third reactor.

The present invention will be described in more detail below by reference to the following examples.

EXAMPLE 1

Using the apparatus as shown in FIG. 1, a low-molecular weight propylene homopolymer was produced in the first reactor 6, and a high-molecular weight propylene-ethylene copolymer having a copolymer moiety of a high intrinsic viscosity [η] was produced in the second reactor 8.

The capacity of each reactor was 200 L. A titanium tetrachloride catalyst on magnesium support was fed to the first reactor 6 through the line 2 at a rate of about 0.04 g/hr in terms of titanium together with propylene fed through the line 1 at a rate of 37.5 kg/hr. Triethylaluminum as an organoaluminum compound and dicyclopentyldimethoxysilane as an electron donor were continuously fed to the first reactor 6 through the lines 4 and 5, respectively, in a molar ratio of 4:1. Further, a hydrogen gas as a molecular weight modifier was fed to the first reactor 6 through the line 3 at a rate of 395 L/hr.

In the first reactor 6, propylene was vapor phase-polymerized at 80° C. under 3.0 MPa·G. The resultant polymer powder together with its accompanying gas was transferred into the second reactor 8 through the line 7.

In the second reactor 8, propylene and ethylene were vapor phase-polymerized at 60° C. under 1.6 MPa·G. No additional catalyst components were fed to the second reactor 8, but ethylene was fed through the line 17 at a rate of 5.5 kg/hr to obtain copolymer. The circulating gas 10, i.e., the multicomponent gas composed of propylene, ethylene and hydrogen, taken out of the second reactor 8 was compressed to 1.97 MPa·G by the compressor 12. From the inert gas feed line 20, nitrogen was fed at a rate of 1.0 Nm$^3$/hr. The heat exchanger 13 was so controlled as to maintain the inner temperature of the separator 15 at −20° C. A part of the unliquefied gas was discharged through the vent line 14 at a rate of 3.8 kg/hr, and the liquefied gas and the remaining unliquefied gas were recycled to the second reactor 8. The molar ratio of the fluid recycled to the second reactor 8 to the multicomponent gas taken out of the second reactor 8 was 0.93.

During the above operations, the hydrogen concentration in the first reactor was 8.9 mol %, and the hydrogen and ethylene concentrations of the fluid recycled to the second reactor 8 were 0.18 mol % and 40.1 mol %, respectively. As a result of the above two-stage polymerization, a propylene-ethylene copolymer having an ethylene content of 45% by weight and comprising a homopolymer moiety having an intrinsic viscosity [η] of 1.1 dL/g and a copolymer moiety having an intrinsic viscosity [η] of 6.5 dL/g was obtained from the second reactor at a rate of 35.3 kg/hr.

The results are shown in Table 1.

The intrinsic viscosity [η] (dL/g) was measured at 135° C. in decalin.

Comparative Example 1

The same procedure as in Example 1 was repeated except for the following conditions A to C.

A: The feed rate of ethylene to the second reactor 8 was changed to 4.5 kg/hr.

B: No nitrogen was fed through the inert gas feed line 20.

C: No gas was discharged through the vent line 14.

During the operations, the hydrogen concentration in the first reactor was 9.0 mol %, the hydrogen and ethylene concentrations of the fluid recycled to the second reactor 8 were 8.3 mol % and 40.1 mol %, respectively. As a result of the two-stage polymerization, a propylene-ethylene copolymer having an ethylene content of 45% by weight and comprising a homopolymer moiety having an intrinsic viscosity [η] of 1.1 dL/g and a copolymer moiety having an intrinsic viscosity [η] of 2.5 dL/g was obtained from the second reactor at a rate of 35.3 kg/hr. Although no additional hydrogen was fed to the second reactor 8, the hydrogen concentration in the second reactor 8 was extremely high as compared with Example 1 by the influence of the hydrogen concentration in the first reactor 6.

The results are shown in Table 1.

Comparative Example 2

The same procedure as in Example 1 was repeated except for the following conditions A to C.

A: The feed rate of ethylene to the second reactor 8 was changed to 4.4 kg/hr.

B: No nitrogen was fed through the inert gas feed line 20.

C: The discharge rate from the vent line 14 was changed to 0.69 kg/hr.

The molar ratio of the fluid recycled to the second reactor 8 to the multicomponent gas taken out of the second reactor 8 was 0.98.

During the operations, the hydrogen concentration in the first reactor was 8.9 mol %, the hydrogen and ethylene concentrations of the fluid recycled to the second reactor 8 were 0.64 mol % and 39.9 mol %, respectively. As a result of the two-stage polymerization, a propylene-ethylene copolymer having an ethylene content of 45% by weight and comprising a homopolymer moiety having an intrinsic viscosity [η] of 1.1 dL/g and a copolymer moiety having an intrinsic viscosity [η] of 5.1 dL/g was obtained from the second reactor at a rate of 35.3 kg/hr. Although no additional hydrogen was fed to the second reactor 8, the hydrogen concentration in the second reactor 8 was extremely high as compared with Example 1, but lower than Comparative Example 1, by the influence of the hydrogen concentration in the first reactor 6.

The results are shown in Table 1.

TABLE 1

|  | Example 1 | Comparative Example 1 | Comparative Example 2 |
|---|---|---|---|
| Hydrogen concentration in first reactor (mol %) | 8.9 | 9.0 | 8.9 |
| Hydrogen concentration in fluid returned to second reactor (mol %) | 0.18 | 8.3 | 0.64 |
| Ethylene concentration in fluid returned to second reactor (mol %) | 40.1 | 40.1 | 39.9 |
| Polymer produced |  |  |  |
| [η] of homopolymer moiety (dL/g) | 1.1 | 1.1 | 1.1 |
| [η] of copolymer moiety (dL/g) | 6.3 | 2.5 | 5.1 |
| Ethylene content of copolymer moiety (wt %) | 45 | 45 | 45 |

INDUSTRIAL APPLICABILITY

In accordance with the present invention, in a continuous multistage polymerization of olefins, the composition of gas in the later-stage vapor-phase polymerization reactor is easily and stably controlled. As a result, olefin polymers having desired molecular weight distribution and composition are produced.

What is claimed is:

1. A process for polymerizing olefins using a plurality of series-connected polymerization reactors in which at least one of second and subsequent reactors is a vapor-phase polymerization reactor containing a multicomponent gas, the process comprising:

taking the multicomponent gas out of the vapor-phase polymerization reactor;

mixing the multicomponent gas with an inert gas which is lighter than at least one component of the multicomponent gas, thereby obtaining a mixed gas;

compressing and/or cooling the mixed gas to liquefy a part of the multicomponent gas;

discharging at least a part of a gaseous mixture comprising the inert gas and an unliquefied multicomponent gas out of a reaction system; and returning a fluid comprising the remainder of the gaseous mixture and the liquefied multicomponent gas to the vapor-phase polymerization reactor.

2. The process according to claim 1, wherein the inert gas is heavier than at least one component of the multicomponent gas.

3. The process according to claim 1, wherein the multicomponent gas contains hydrogen.

4. The process according to claim 1, wherein the inert gas is nitrogen.

5. The process according to claim 1, wherein the inert gas is a saturated.

6. The process according to claim 1, wherein the cooling is performed using a plurality of heat exchangers, and the inert gas is fed to an inlet of a heat exchanger where the liquefaction of the multicomponent gas begins.

7. The process according to claim 1, wherein the multicomponent gas contains hydrogen, and the fluid returned to the vapor-phase polymerization reactor has a hydrogen concentration of 10 mol % or less.

8. A process for polymerizing olefins using a plurality of series-connected polymerization reactors in which at least one of second and subsequent reactors is a vapor-phase polymerization reactor containing a multicomponent gas, the process comprising:

taking the multicomponent gas out of the vapor-phase polymerization reactor;

mixing the multicomponent gas with an inert gas which is lighter than at least one component of the multicomponent gas, thereby obtaining a mixed gas;

compressing and/or cooling the mixed gas to liquefy a part of the multicomponent gas;

discharging at least a part of a gaseous mixture comprising the inert gas and an unliquefied multicomponent gas out of a reaction system; and returning a fluid comprising the remainder of the gaseous mixture and the liquefied multicomponent gas to the vapor-phase polymerization reactor, wherein the molar ratio of the fluid returned to the vapor-phase polymerization reactor to the multicomponent gas taken out of the vapor-phase polymerization reactor is 0.5 or more.

9. A process for polymerizing olefins using a plurality of series-connected polymerization reactors in which at least one of second and subsequent reactors is a vapor-phase polymerization reactor containing a multicomponent gas comprising an olefin and hydrogen, the process comprising;

taking the multicomponent gas out of the vapor-phase polymerization reactor;

mixing the multicomponent gas with an inert gas which is lighter than the olefin in the multicomponent gas, thereby obtaining a mixed gas;

compressing and/or cooling the mixed gas to liquefy at least a part of the olefin in the multicomponent gas;

discharging at least a part of a gaseous mixture comprising the inert gas and the unliquefied multicomponent gas out of a reaction system; and returning a fluid comprising the remainder of the gaseous mixture and the liquefied olefin to the vapor-phase polymerization reactor.

10. The process according to claim 9, wherein the inert gas is nitrogen.

11. The process according to claim 9, wherein the inert gas is a saturated hydrocarbon.

12. The process according to any one of claims 9, wherein the cooling is performed using a plurality of heat exchangers, and the inert gas is fed to an inlet of a heat exchanger where the liquefaction of the multicomponent gas begins.

13. A process for polymerizing olefins using a plurality of series-connected polymerization reactors in which at least one of second and subsequent reactors is a vapor-phase polymerization reactor containing a multicomponent gas comprising an olefin and hydrogen, the process comprising:

taking the multicomponent gas out of the vapor-phase polymerization reactor;

mixing the multicomponent gas with an inert gas which is lighter than the olefin in the multicomponent gas, thereby obtaining a mixed gas;

compressing and/or cooling the mixed gas to liquefy at least a part of the olefin in the multicomponent gas;

discharging at least a part of a gaseous mixture comprising the inert gas and the unliquefied multicomponent gas out of a reaction system; and returning a fluid comprising the remainder of the gaseous mixture and the liquefied olefin to the vapor-phase polymerization reactor, wherein the multi-component gas contains hydrogen, and the fluid returned to the vapor-phase polymerization reactor has a hydrogen concentration of 10 mol% or less.

14. A process for polymerizing olefins using a plurality of series-connected polymerization reactors in which at least one of second and subsequent reactors is a vapor-phase polymerization reactor containing a multicomponent gas comprising an olefin and hydrogen, the process comprising;

taking the multicomponent gas out of the vapor-phase polymerization reactor;

mixing the multicomponent gas with an inert gas which is lighter than the olefin in the multicomponent gas, thereby obtaining a mixed gas;

compressing and/or cooling the mixed gas to liquefy at least a part of the olefin in the multicomponent gas;

discharging at least a part of a gaseous mixture comprising the inert gas and the unliquefied multicomponent gas out of a reaction system; and returning a fluid comprising the remainder of the gaseous mixture and the liquefied olefin to the vapor-phase polymerization reactor, wherein the molar ratio of the fluid returned to the vapor-phase polymerization reactor to the multicomponent gas taken out of the vapor-phase polymerization reactor is 0.5 or more.

* * * * *

UNITED STATES PATENT AND TRADEMARK OFFICE
CERTIFICATE OF CORRECTION

PATENT NO. : 6,818,708 B2
DATED : November 16, 2004
INVENTOR(S) : Satou et al.

It is certified that error appears in the above-identified patent and that said Letters Patent is hereby corrected as shown below:

<u>Title page,</u>
Items [45] and [*] Notice, should read as follows:
-- [45] **Date of Patent: *Nov. 16, 2004**
   [*]   Notice:      Subject to any disclaimer, the term of this patent is extended or adjusted under 35 U.S.C. 154(b) by 113 days.

This Patent is subject to a terminal disclaimer. --

Signed and Sealed this

Fifteenth Day of February, 2005

JON W. DUDAS
*Director of the United States Patent and Trademark Office*